United States Patent Office 3,089,600
Patented May 14, 1963

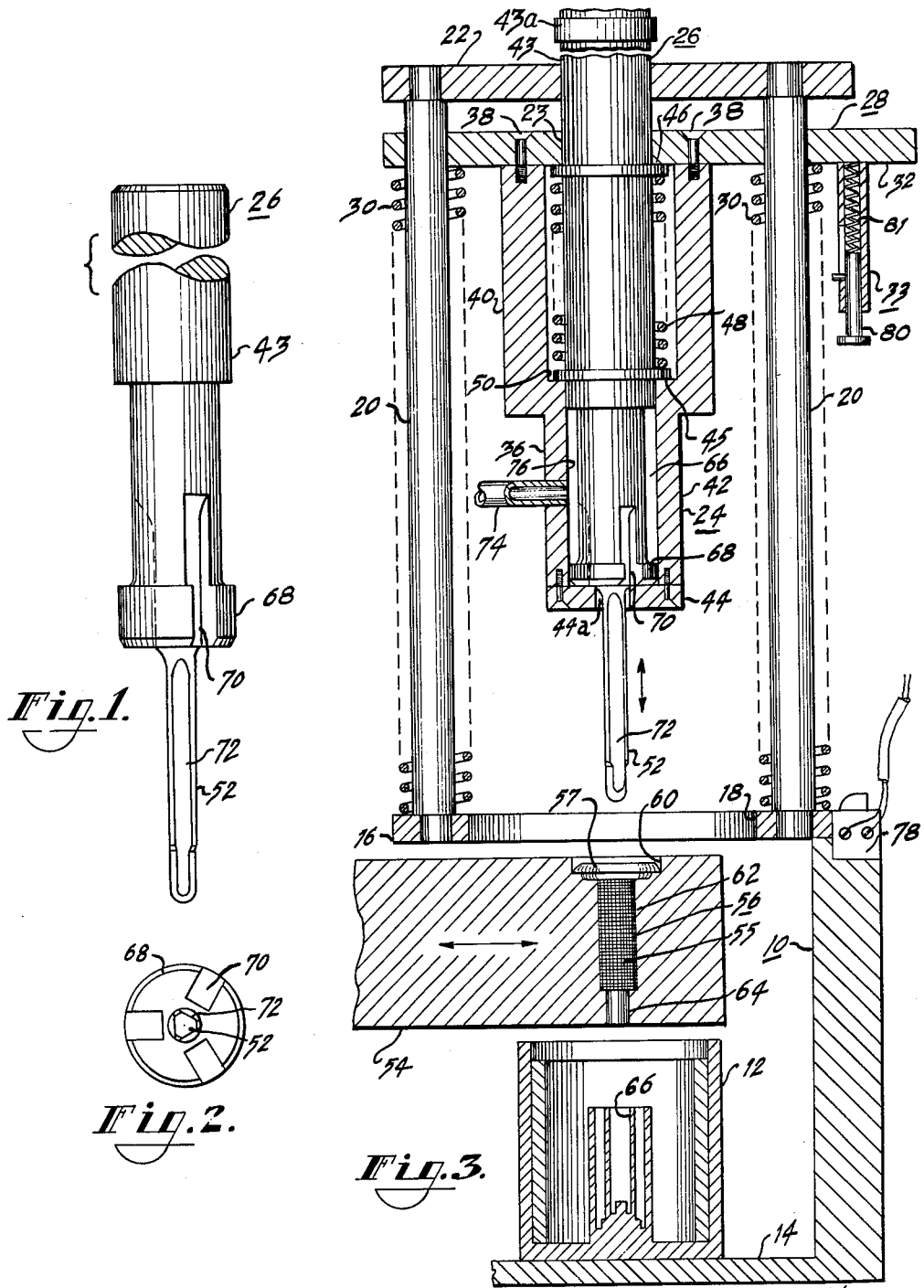

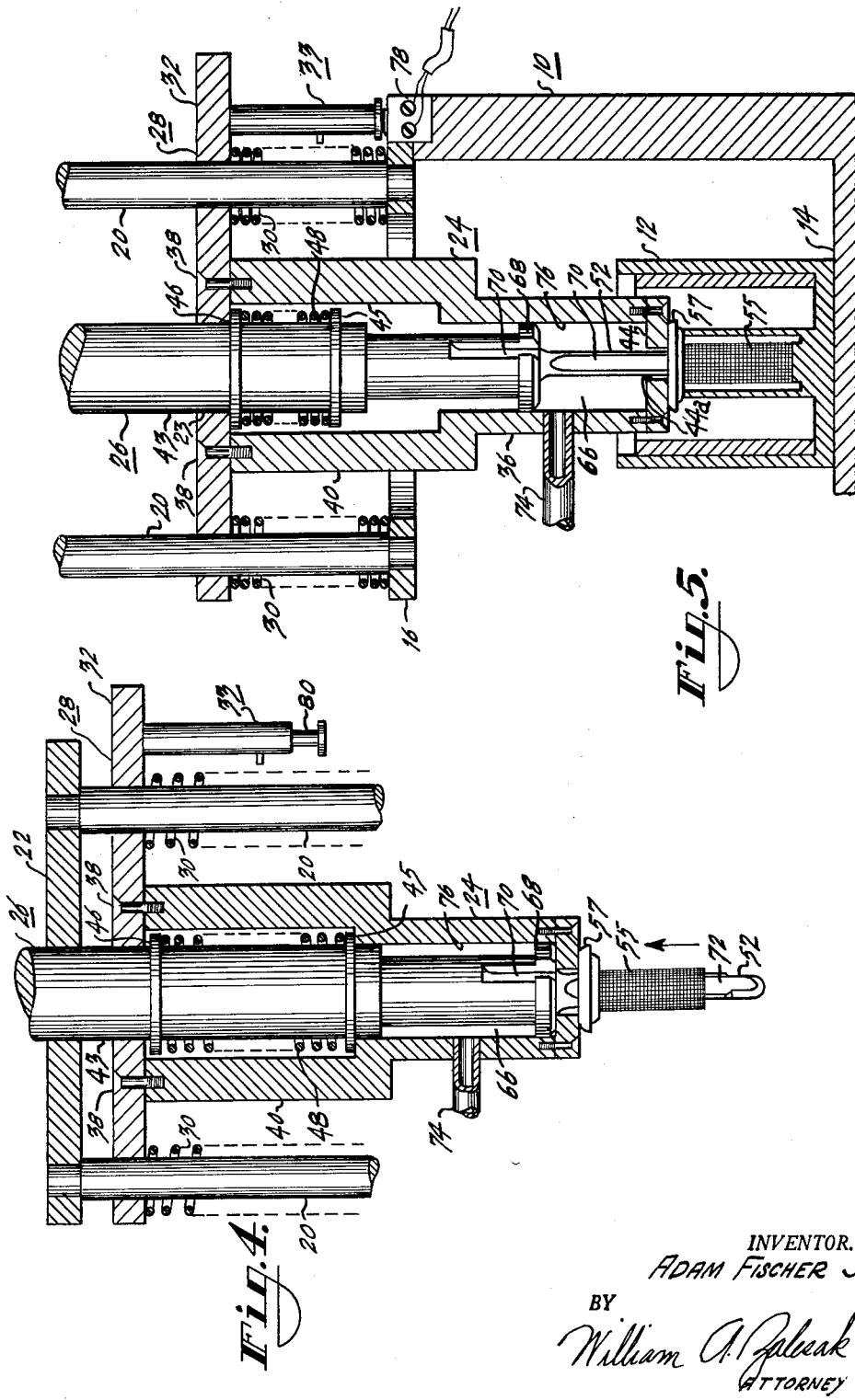

3,089,600
TRANSFER APPARATUS
Adam Fischer, Jr., Maplewood, N.J., assignor to Radio Corporation of America, a corporation of Delaware
Filed May 26, 1961, Ser. No. 121,283
10 Claims. (Cl. 214—1)

This invention relates to apparatus for transferring one or more small parts, and more specifically, this invention relates to a transfer device employing an elongated rod or quill. The device is of special utility in transferring electron tube elements from turret wells into brazing jigs.

In one type of vacuum tube having concentric elements, the individual electrodes are cylindrically tubular in shape. An annular flange is provided for each electrode and a base wafer having support legs and lead pins therethrough is also provided. In assembly, the tubular electrodes and their flanges are inserted into a brazing jig and the base wafer, the support legs and lead pins are also inserted into the brazing jig. The brazing jig and its contents are then raised to brazing temperature, at which temperature each electrode is brazed to its flange and to the leads and support pins which lead and support pins are brazed vacuum tight in the wafer. Vacuum tubes of this type are very small and the tubular electrodes thereof are from about $3/16$ to $5/16$ of an inch in length and from less than $1/16$ to about $1/8$ of an inch in diameter.

The brazing jig is commensurately small and the clearances therein are very small. Loading such a jig manually involves careful tedious work. If an electrode or its flange is loaded into the jig improperly, the electrode and its flange are rendered useless, or if the improper loading is not noticed in time, the vacuum tube resulting from such an improper assembly may be inoperative.

A quill has been developed to pick up tube electrodes and their flanges from turret wells in which they are deposited and for transferring them to the brazing jigs. The quill is inserted into the annular flange and the tubular electrode, previously deposited in the well, and frictionally engages the electrode and its flange. Then the quill is withdrawn whereby the electrode and its flange are taken out of the well. The quill is then put into the jig to deposit the electrode and its flange into the jig.

A very small inaccuracy in the internal size of the electrode or of its flange results in an undesirable variation of frictional force by which the electrode and its flange are held on the quill. In extreme cases where the electrode or flange is oversized, the quill will not frictionally engage the electrode and its flange. At the other extreme the quill may so tightly engage the electrode and its flange that difficulty is experienced in stripping the electrode and its flange from the quill. In the first case, no electrode and flange are fed to the jig, and in the second case, the electrode and flange may be distorted to the point of uselessness upon stripping the tube elements off the quill.

It is therefore an object of this invention to provide an improved transfer apparatus for small tubular and flange-like parts from a supply station to a jig of small dimensions.

It is another object of this invention to provide a transfer mechanism employing a quill means which will support a tubular or annular work piece without frictional contact therewith.

It is a further object of this invention to provide a transfer mechanism including a pick-up quill that will support and transfer tubular or annular electron tube elements which may vary by acceptable tolerances in transverse dimensions either separately or together from a supply station to a loading station.

This invention comprises an elongated rod-like quill small enough in lateral extent to slip easily into a tube electrode and flange and without any portion of the quill touching the tube electrode or its flange. The quill is cut away in a longitudinal direction, whereby it has at least one longitudinally extending surface which is grooved or indented and has less radial extent than the adjacent lateral surface or surfaces. An electrode stripper may be provided surrounding a portion of the quill and slidable therealong for positively stripping from the quill the electrode held thereon, and means are provided to apply a vacuum through the stripper and along the length of the cut away portion or portions of the quill. The rush of air along the cut away portion of the quill will entrain the tube element, and will hold a flange against the stripper or will hold a tubular electrode on the quill, or will hold both of them on the quill.

This invention may be better understood by reference to the following description thereof taken together with the drawing, in which:

FIG. 1 is a side elevation of the quill of this invention;

FIG. 2 is a bottom end view of FIG. 1;

FIG. 3 is a longitudinal section, showing the quill and the stripper of this invention and showing their relation with respect to a dial having a well therein for holding an electrode and its flange, and showing the welding jig to which the electrode and its flange are to be transferred;

FIG. 4 is a partial view, in section, of the quill and stripper of this invention holding an electrode and its flange thereon; and, FIG. 5 is a partial view in longitudinal section of the quill and stripper inserting an electrode and its flange into a brazing jig.

A mechanism is described herein for transferring one or more work pieces such as a grid and its flange (see FIG. 3), from a well 56 in a rotatable and indexable and laterally movable dial 54 to a brazing jig 12. This mechanism comprises an elongated quill mounted for longitudinal motion and a stripper mounted on the quill for longitudinal, relative motion along the quill. A dial or turret which has a plurality of such wells at indexable positions thereof, is mounted so that the quill, upon longitudinal movement thereof in one direction, can enter a well and take up the work piece or pieces therein. The quill is then moved in the opposite, longitudinal direction until it clears the well and then the dial is moved laterally to a position where it is out of line of travel of the quill. The quill then is moved longitudinally in the said one direction until it enters a brazing jig 12 which is positioned in the path of the travel of said quill. The nose or end portion 52 of the quill enters a mating portion in the brazing jig to move the brazing jig into exact alignment with the quill, and the work piece or pieces are then stripped from the quill by the stripper and left in the brazing jig. The quill and its stripper are then moved back to their original position. The well in the dial is loaded by hand or by machine means, and the dial is moved back into the path of the quill. In moving the dial back, it is indexed one position, whereby the next well in the dial, which contains one or more work pieces is presented to the quill.

The quill provided is so small in lateral extent that it does not frictionally engage the work piece or pieces in the well of the dial. The quill has at least one grooved or indented longitudinally extending surface. A stripper surrounds and is longitudinally movable with respect to the quill. The overlapping portions of the quill and the stripper are formed to provide a chamber around the quill and communicating with the indented surface or groove of the quill. Vacuum apparatus is connected to the chamber. As a result, suction is produced longitudinally of the quill and along the grooved portions thereof. The resultant air movement holds a flange and a tube electrode on the quill without physical contact of the quill with the flange or with the tube electrode.

Turning to FIG. 3, an L-shaped support 10 comprising a vertical portion is provided. The brazing jig 12 is mounted on the horizontal portion 14 of the support. A further support plate 16 is mounted at the top of the vertical portion of the support plate 10 and overlies the jig 12. The support 16 has a hole 18 therethrough for a purpose to be described. Rods 20 extend upwardly from the support 16, one on each side of the hole 18. The upper ends of rods 20 are fixed in holes in a bearing plate 22. A quill and stripper assembly 24 is slidably mounted on the rods 20 with the upper end of the quill 26 slidably extending through the bearing plate 22.

The slidable mounting of the quill and stripper assembly 24 includes a push plate 28 slidably mounted on rods 20 between the further support plate 16 and the bearing plate 22. Compression springs 30 are provided on each rod 20 between the further support plates 16 and push plate 28 and they urge the push plate 28 upwardly. The push plate 28 extends laterally at 32 outwardly from one side beyond a rod 20. A telescoping stop 33 which overlies the further support plate 16 fixed to support plate 10, extends downwardly from extension 32 of the push plate 28. Upon pushing down on the push plate 28, the push plate moves down, compressing springs 30 until the telescoping stop 33, by contact with the support plate 16, prevents further downward motion. The push plate 28 has a hole 23 therethrough in registry with and of the same size as the hole in the bearing plate 22. The stripper structure 36 is fixed to and below the push plate 28 as by screws 38. The stripper comprises an upper hollow cylindrical portion 40 and a lower hollow cylindrical portion 42 of smaller diameter. A plate 44 having a hole 44a therein is provided for the bottom part of cylindrical portion 42. The inside diameter of the lower hollow cylinder portion 42 is the same as the internal diameter of the hole 23 in the push plate 28 and in the bearing plate 22 to act as a bearing for quill 26 as will be described. The quill 26 extends through the stripper 36, the push plate 28, and the bearing plate 22, and a thinner lower portion 52 of the quill 26 extends through the hole 44a in the plate 44.

The quill 26 comprises a rod 43 having a diameter that slidably fits the hole in the bearing plate 22 and the hole in the push plate 28. A smaller diameter position of the rod 43 extends within the lower hollow portion 42 of the stripper 36. A washer 45 is fixed to the lower rod of the larger diameter part of rod 43 and another washer 46 is slidably mounted on the upper part of the rod 43 within the cylindrical portion 40. A compression spring 48 is placed between the two washers 45 and 46. The two washers 45 and 46 and the spring 48 are positioned within the chamber formed by upper cylindrical portion 40 and between the push plate 28 and a shoulder 50 defining the boundary between the upper and the lower cylindrical portions 40 and 42 of the stripper. The lower end of the quill 26 is of reduced transverse dimension and is adapted to extend through the hole 44a at the bottom end of the stripper 36 and into vacuum tube electrodes.

Upon pushing down on the extension 32 of the push plate 28, the stripper and quill assembly 24 moves downwardly until motion of the quill 26 is stopped. The downward motion of the quill may be stopped by a collar 43a (FIG. 3) fixed thereto and contacting the top of bearing plate 22. Upon further downward motion of the push plate 28, the quill 26 will remain stationary and the spring 48 will be compressed. The stripper 36 however will move downwardly with respect to the quill until the telescopic stop 33 prevents further downward motion by contact with the L-shaped support 10.

A circular disk-like dial 54 having wells 56 therein is provided. Dial 54 is rotatably mounted about an axis (not shown) to the left (as shown in FIG. 3) of the quill 26 and is movable as a whole between a position where the well 56 is in line with the quill 26 and a position to the left where the dial 54 is out of the path of travel of the quill and stripper assembly 24. The wells extend through the dial 54. The well 56 is provided with an upper larger diameter recess 60 large enough to receive a flange 57, an intermediate size chamber 62 beneath and communicating with the larger recess 60 and large enough to receive a vacuum tube element, here shown as a grid 55, and a lower smaller size hole 64 large enough to receive the end portion 52 of the quill 26 but not large enough for the grid to fall through. A plurality of equally spaced wells (only one of which is shown) are arranged around the dial 54. When the dial 54 is in its left hand position (not shown) a well is loaded with a tube electrode 55 and its flange 57. As the dial 54 is moved towards the right, the dial indexes one position and presents a loaded well to the quill. As thus far described, the transfer apparatus does not differ from known apparatus. In the known device, the lower end of the quill is of frustro-conical shape and has a diameter near the top thereof necessary to fit frictionally into a vacuum tube flange and electrode. The operation of the known device is as follows: The dial 54 presents a loaded well to the quill 26. The operator pushes down on the extension 32 of the push plate 28 until the quill frictionally engages the flange and the grid in the well 56. The operator then allows the springs 30 to raise the quill and stripper assembly 24 until the quill clears the well 56. The dial 54 is then moved to the left until it is out of the path of travel of the quill and stripper assembly 24. The operator then pushes down on the extension 32 until the downward motion of the quill is stopped. The bottom portion of the quill fits the tubular portion 66 of the jig 12, whereby the jig may be moved laterally a small amount to provide final positioning of the jig 12 with respect to the quill. The operator continues to push down on the extension 32, the spring 48 is compressed, and the stripper 36 continues downwardly until the stop 33 prevents further downward motion of the stripper. At this time, the stripper 36 has stripped the grid and its flange from the quill and into the brazing jig 12. The springs 30 are allowed to raise the quill and stripper assembly 24 to its previous position. By manually grasping the top portion of the quill 26, the quill and stripper are constrained to move upwardly together for a sufficient distance to prevent frictional re-engagement of the tube electrodes with the quill. The spring 48 expands and restores the original relative position of the quill and stripper. The dial 54 is moved to its right-hand position and is indexed one position while so moving, thereby presenting a loaded well to the quill, and the cycle is completed.

In this embodiment of the invention, the lower end 52 of the quill 26 is made too small in lateral dimension to fill the hole in the smallest tubular or annular electrode that is to be transferred and is shaped to provide channels between the quill and an electrode thereon for air to flow therealong. Also vacuum means is provided to cause a flow of air (the ambient gas) along at least a portion of the quill between the quill and the electrode portion in a direction towards the stripper.

The large diameter portion 43 (see also FIG. 1) of the quill 26 is cut away to provide an elongated annular recessed portion 66 at least part way around it, leaving a bearing collar 68 between the lower reduced portion 52 of the quill 26 and the recessed portion 66. Axially extending communicating passageways or slots 70 are cut through the collar 68 and into the quill 26 in the region of the groove 66 to a depth greater than the depth of the annular recess 66. The portion 52 of the quill of reduced lateral extent is cut away at 72 just below its juncture with the larger diameter portion 43 in a manner such that the cut away portions 72 extend towards the slots 70. The cut away surfaces 72 are shown as flat surfaces, however they may be indented or grooved or depressed in any manner in a longitudinal direction. Three flat surfaces 72 and three slots 70 are shown in the quill, however, one or more may be used.

Further, the hole 44a in the end of the stripper 36 is large enough to uncover at least a portion of the slots 70. Air hose 74 is connected to the stripper 36 at the smaller diameter portion 42 thereof and in communication with the annular recess 66. In this manner, air may be sucked up along the cut away portions 72 of the quill, through the hole 44a in the stripper 36, into the slots 70 and into the chamber 76 formed between annular recess 66 in the quill 26 and the inside wall of the lower portion 42 of the stripper 36, and out through the hose 74. When no element is held by the quill, air moves upwardly near the hole 44a in the stripper 36. When the quill is inserted into and through the hole of an annular flange 57 to the point that the flange and the lower end of the stripper are closely spaced, air flowing upwardly along the quill holds the flange against the plate 44 and obstructs flow of air radially between the flange and the plate 44. The flow of air along the quill and through the hole in the annular flange 57 holds the flange against the stripper without physical contact of the quill and the flange. The hole in the annular flange 57 being of larger diameter than the lateral extent of the lower portion 52 of the quill, air which flows through the central hole of the annular flange 57 flows along the quill. When a cylindrical tubular electrode surrounds but does not touch the quill and is in contact with or close to an annular flange which is itself in contact with or close to the bottom of the stripper, the air flowing through the tubular electrode and along the flats 72 of the quill holds the electrode against its flange. If the tubular electrode to be held on the quill is an openwork grid, air can flow laterally of the quill and through the holes in the grid. The lateral flowing air does not serve the desired purpose of lifting a grid up to bear against its flange. The air that flows longitudinally of the quill serves this desired purpose. Therefore, the quill is indented in a longitudinal manner from circular cross section to provide channels along the quill. Due to these channels, air flowing into the hole 44a in the stripper 36 has a path or paths along the quill and more air, proportionately, will flow longitudinally of the quill, providing more lifting force for an openwork grid, than if the channels were not provided.

Therefore streams of air flow upward along the quill flats 72 and result in entraining an openwork grid 56 and in holding it in a position against the annular flange 57. The presence or absence of an annular flange 57 does not change this operation. In the absence of a flange, a tube electrode such as grid 56 will be held on the quill by air flowing along the flats thereof.

The suction is on at all times except for the short time when the flange and electrode is being stripped from the quill. As long as the distance between the bottom of the stripper and the flange is less than a short distance, depending on the flow of air and the weight of the electrodes, the suction will hold the flange on the quill. When it is desired to drop an electrode off a quill, the air suction is turned off. When the bottom part of the stripper is such a short distance that is, in one instance, about ¼ of an inch or more above the annular flange, or electrode, the suction will not hold the tube element on the quill. Therefore, if the suction is turned off during the stripping operation and remains off after the tube elements are seated in the jig and until the stripper has moved upwardly more than this small distance, the suction, then applied, will not remove the elements from the jig and the tube elements will remain seated in the jig. Since there is no frictional contact of the quill and the tube elements, the quill cannot re-engage the tube elements frictionally. Therefore, under these circumstances the elements deposited in the jig 12 will not be removed inadvertently when the quill and stripper are retracted.

Means are therefore provided for turning off the suction during the stripping operation. This means comprises an electric switch 78 mounted on the L-shaped support 10 in the path of the telescoping stop 33. The switch 78 is normally closed, to cause suction to be applied to the air hose 74. Contact of the stop 33 with the switch 78 opens the switch and keeps it open until contact on the switch is removed thus turning off the suction. A spring pressed telescopic extension 80 is provided in the end of the stop 33. The length of the stop 33 and the length of the extension 80 and the strength of the compression spring 81, pressing on the extension 80, are so chosen that the extension 80 contacts the switch to open it when the stripper 36 is moved down with respect to the quill 26. This occurs when downward motion of the quill has been stopped by contact of a collar (not shown, but mentioned above) with the top of plate 22, while pushing down on push plate 28. As the stripper 36 moves back with respect to the quill 26 to its non-stripping position, the switch 78 is kept open by pressure of the telescopic extension 80 thereon. In this manner, the stripper 36 is a short distance above the tube element just deposited in the jig 12 at the time that the suction is turned on again. By proper choice of the throw of the extension 80, this short distance will be such that the suction will not take the tube elements 55, 57 out of the jig 12.

Operation of the device of this invention is otherwise similar to operation of the known device mentioned above. Note that, in this embodiment of the invention suction is applied to the stripper 36 at all times except when the stop 33 contacts the switch 78. While the operation of the prior art device and of this device has been described as being manual, it is clear that the device may be mechanically and electrically controlled.

What is claimed is:

1. A device for transferring an object comprising an elongated rod comprising a portion of first cross-sectional area joined to a portion of reduced cross-sectional area adapted to be inserted within an object, said portion of first cross-sectional area having a recessed area in a region removed from the juncture of the said two portions, said device having a communicating passageway extending between said recessed area and said juncture, said portion of reduced area having a longitudinally extending groove, and means to induce a flow of ambient gas along said groove to hold said object on said portion of reduced area.

2. A transfer and stripping device comprising an elongated cylindrical rod comprising a portion of first diameter joined to a portion of reduced diameter, said portion of first diameter having an elongated annular recessed portion in a region removed from the juncture of the portion of first diameter with the portion of reduced diameter, whereby there is a collar of said first diameter adjacent said juncture, said collar having a communicating passageway extending therethrough and communicating with said recess, said portion of reduced diameter having a longitudinally extending indented surface, a stripper comprising a hollow structure partially closed at one end and having a hole in said end, said portion of reduced diameter extending through said hole, said collar slidably fitting within said hollow structure, the length of said hollow structure being at least as long as the axial length of said recessed portion, and means permitting application of suction to said recessed portion for causing a flow of gas along said indented surface.

3. A transfer and stripping device comprising an elongated cylindrical rod comprising a portion of first diameter joined to a portion of reduced diameter, said portion of first diameter having an annular recess in a region removed from the juncture of the portion of first diameter with the portion of reduced diameter, whereby there is a collar of said first diameter adjacent said juncture, said collar having a longitudinally extending slot therethrough communicating with said recess, said portion of reduced diameter having a longitudinally extending flat surface, a stripper comprising a hollow cylinder partially closed at one end and having a hole in said end, said portion of reduced diameter extending through said hole, said collar slidably fitting within said hollow cylinder, said cylinder being movable with respect to said rod, and means permitting application of suction to said recess for causing a flow of air along said flat surface.

4. A transfer and stripping device comprising an elongated cylindrical rod comprising a portion of first diameter and a portion of reduced diameter, said portions having a juncture, said portion of first diameter having a circumferentially extending recess in a region removed from said juncture, whereby there is a collar of said first diameter adjacent said juncture, said collar having a longitudinally extending slot therethrough communicating with said recess, said portion of reduced diameter having a longitudinally extending flat surface, a stripper comprising a hollow cylinder partially closed at one end and having a hole in said end, said reduced diameter portion extending through said hole, said collar slidably fitting within said hollow cylinder, means supporting said cylinder for movement with respect to said rod, and means for producing an air flow along said reduced diameter portion to the inside of said hollow cylinder.

5. A transfer and stripping device comprising an elongated cylindrical rod comprising a portion of first diameter joined to a portion of reduced diameter, said portion of first diameter having an elongated annular recessed portion in a region removed from the juncture of the portion of first diameter with the portion of reduced diameter, whereby there is a collar of said first diameter adjacent said juncture, said collar having a slot extending therethrough communicating with said recessed portion, said portion of reduced diameter having a longitudinally extending indented surface, a stripper comprising a hollow cylinder partially closed at one end and having a hole in said end, said portion of reduced diameter extending through said hole, said collar slidably fitting within said hollow cylinder, said length of the cylinder being at least as long as the axial length of said recessed portion, means supporting said cylinder for movement with respect to said rod, and an air hose communicating with the chamber formed by said hollow cylinder at the region of said recessed portion permitting application of suction to said recessed portion for causing a flow of air along said indented surface.

6. A transfer and stripping mechanism comprising an elongated cylindrical rod comprising a portion of a first diameter joined to a portion of reduced diameter, said portion of first diameter having a circumferential recess removed from the juncture of the portion of first diameter with the portion of reduced diameter, whereby a collar of said first diameter is formed adjacent said juncture, said collar having a longitudinally extending slot therethrough communicating with said recess, said portion of reduced diameter having a longitudinally extending indented surface, a stripper comprising a hollow cylinder having a hole in one end, said portion of reduced diameter extending through said hole, said collar slidably fitting within said hollow cylinder, means supporting said rod and said stripper for movement together in such direction that the reduced diameter portion of said rod leads, means for applying suction to said hollow cylinder, said supporting means permitting movement of said stripper in said direction with respect to said rod, means to turn said suction off responsive to the motion of said stripper for a predetermined distance in said direction, said supporting means permitting movement of said stripper in the reverse of said first-mentioned direction, and means for maintaining said suction off for a portion of the travel of said stripper in said reverse direction.

7. A transfer and stripper mechanism for transferring small flange-like and tubular parts from a supply station to a jig and including an elongated part-engaging member mounted for longitudinal movement for engaging a part, said member having at one end a part-engaging portion of smaller transverse dimension than the remainder of said elongated member, the remainder of said elongated member having an annular recessed portion adjacent of said portion of smaller transversed dimension, said mechanism having a longitudinal passageway extending between said annular recessed portion and said part of smaller transverse dimension, said part of smaller transverse dimension having a longitudinally directed indented surface extending from said passageway, a stripper surrounding said elongated member and providing with said annular recessed portion a chamber, said stripper having means communicating with said chamber for evacuating said chamber for causing air to be sucked along said longitudinally indented surface and through said passageway into said chamber.

8. A transfer and stripper mechanism for transferring small flange-like and tubular parts from a supply station to a jig and including an elongated part-engaging member mounted for longitudinal movement for engaging a part, said member having at one end a part-engaging portion of smaller transverse dimension than the remainder of said elongated member, a stripper surrounding said elongated member and providing with a portion of said elongated member a chamber, said elongated part-engaging member having a longitudinal passageway extending along a portion of said remainder of said elongated member and terminating at said part of smaller transverse dimension, said part of smaller transverse dimension having a longitudinally directed depressed surface extending from said passageway, said stripper having means communicating with said chamber for evacuating said chamber for causing air to be sucked along said longitudinally depressed surface and through said passageway into said chamber.

9. A transfer and stripper mechanism for transferring small flange-like and tubular parts from a supply station to a jig and including an elongated rod-like part-engaging member mounted for longitudinal movement for engaging a part, said member having at one end a part-engaging portion of one diameter and another portion of larger diameter, the portion of larger diameter having an annular recessed portion adjacent said portion of smaller diameter, said member having a longitudinal slot extending between said annular recessed portion and said part of smaller diameter, said part of smaller diameter having a longitudinally directed depressed surface extending from said slot, a stripper surrounding said elongated member and providing with said annular recessed portion a chamber, said part-engaging portion of smaller diameter extending through the end of said stripper, said stripper and said part engaging member being relatively movable longitudinally thereof, said stripper having means communicating with said chamber for evacuating said chamber for causing air to be sucked along said longitudinally depressed surface and through said slot into said chamber.

10. A transfer and stripper mechanism for transferring small flange-like and tubular parts from a supply station to a jig and including an elongated part-engaging member mounted for longitudinal movement for engaging a part, said member having at one end a part-engaging portion of smaller transverse dimension than the remainder of said elongated member, the remainder of said elongated member having a recessed portion extending therearound and adjacent said portion of smaller transverse dimension, said member having a longitudinal passageway extending between said annular recessed portion and said part of smaller transverse dimension, said part of smaller transverse dimension having a longitudinally directed indented surface extending from said passageway, a stripper surrounding said elongated member and providing with said annular recessed portion a chamber, said stripper having means communicating with said chamber for evacuating said chamber for causing air to be sucked along said longitudinally indented surface and through said passageway into said chamber for holding said parts on said part-engaging portion by suction.

References Cited in the file of this patent
UNITED STATES PATENTS

| | | |
|---|---|---|
| 1,532,255 | Miller | Apr. 7, 1925 |
| 2,390,298 | Glassner | Dec. 4, 1945 |
| 2,937,786 | Muller | May 24, 1960 |